(12) United States Patent
McDaniel (10) Patent No.: US 8,878,848 B2
(45) Date of Patent: Nov. 4, 2014

(54) METHOD AND DEVICE FOR SNAPPING NORMALS TO CREATE FAIR 3D SURFACES FROM EDGE CURVES

(75) Inventor: Richard Gary McDaniel, Hightstown, NJ (US)

(73) Assignee: Siemens Aktiengesellschaft, Munich (DE)

( * ) Notice: Subject to any disclaimer, the term of this patent is extended or adjusted under 35 U.S.C. 154(b) by 435 days.

(21) Appl. No.: 13/354,394

(22) Filed: Jan. 20, 2012

(65) Prior Publication Data

US 2013/0187913 A1      Jul. 25, 2013

(51) Int. Cl.
*G06T 15/30*      (2011.01)
*G06T 17/20*      (2006.01)

(52) U.S. Cl.
USPC .......................................................... 345/423

(58) Field of Classification Search
CPC ........ G06T 17/30; G06T 17/20; G06T 11/203
USPC ...................... 345/423, 442; 703/2
See application file for complete search history.

(56) References Cited

U.S. PATENT DOCUMENTS

| | | | |
|---|---|---|---|
| 6,549,201 B1 * | 4/2003 | Igarashi et al. | 345/423 |
| 7,586,490 B2 * | 9/2009 | McDaniel | 345/441 |
| 8,072,452 B1 * | 12/2011 | Brown | 345/423 |
| 8,643,650 B1 * | 2/2014 | Vinchon et al. | 345/442 |
| 2008/0297514 A1 * | 12/2008 | Pedersen et al. | 345/442 |

\* cited by examiner

*Primary Examiner* — Carlos Perromat (57) ABSTRACT

A method for generating a three dimensional (3D) surface includes receiving an input corresponding to a plurality of curves joined to define a single edge loop, analyzing each of the plurality of curves to define a plurality of edge segments based on an identified curve feature, calculating snap normal vectors for the endpoints of each of the plurality of edge segments, dividing the segmented edge loop into sub-loops based on the plurality of edge segments, determining the surface normal vectors for the sub-loops and combining these values with the snap surface normals at each end point to produce a final surface normal for each end point, and generating the continuous 3D surface based on triangles associated with the segmented edge loop and the surface normals associated with the end points.

23 Claims, 6 Drawing Sheets

METHOD AND DEVICE FOR SNAPPING NORMALS TO CREATE FAIR 3D SURFACES FROM EDGE CURVES

BACKGROUND

Generating surfaces for three dimensional (3D) models and similar surface modeling tasks are commonly performed by many conventional computer-aided design (CAD) applications and modeling programs. These conventional CAD applications and modeling programs utilize a variety of techniques to compute and generate 3D surfaces. Conventional CAD applications and modeling programs often require a user to specify control points or designate specific algorithms and parameters to define and characterize a curve before the modeling process can be implemented. Moreover, many conventional modeling processes and techniques generate irregular surfaces that include unnecessary bows, wrinkles, or saddle shapes.

Conventional CAD applications and modeling programs often require the user to manually define many of the input variables and parameters before a surface can be generated. Moreover, conventional CAD applications and modeling programs do not provide an automatic mechanism by which smooth and continuous 3D surfaces can be generated based on an analysis of a closed input curve.

SUMMARY

The disclosed system and computer-implemented methods provide an efficient mechanism by which smooth three dimensional (3D) surfaces may be generated based on a closed loop input. In particular, the closed loop represents the edges or boundaries of the resulting fair or smooth 3D surface. The disclosed system and computer-implemented methods provide and result in the efficient processing and generation of fair 3D surfaces. The increased efficiency and processing of result in enhanced performance of the system or controller executing the disclosed method.

In one embodiment, a system for generating a 3D surface based on a closed edge curve is disclosed. The system includes a processor and a memory in communication with the processor. The memory storing processor-executable instructions configured to identify a plurality of curves, wherein the plurality of curves are continuously joined to define a single edge loop, segment the edge loop to define a plurality of edge segments such that each of the plurality of edge segments is associated with a curve feature; define a normal vector for each shared endpoint of each of the plurality of edge segments; reduce the segmented edge loop to a plurality sub-loops by dividing the loop with chords that span from one end point to another such that each sub-loop is defined by three curve segments and wherein at least one of which is an edge segment and the remainder composed of chords; and pairs of sub-loops share a common chord, determine a dihedral angle between surfaces established for each of the pair of triangles when the chord extends between a first set of triangle vertices and a second set of triangle vertices that define each of the sub-loops, and select the surfaces defined by the position of the chord, wherein the selected surfaces are the surfaces having the largest dihedral angle.

In another embodiment, a computer-implemented method for generating a 3D surface based on a closed edge curve is disclosed. The method includes receiving an input corresponding to a plurality of curves joined to define a single edge loop, analyzing each of the plurality of curves to define a plurality of edge segments based on identified curve features. The curve features can be categorized as joining sharp or smooth corners at the end points where the curve segments meet. The curves can be divided into sections that turn and/or bend less than an amount of degrees, and the normal at each shared end point can be calculated based on the whether the end point is sharp or smooth bend. Each particular normal direction can be selected based on and with respect to the plane formed by the edges of the curve joining at the end point. An average normal for each end point can further be calculated using estimated normals from sub-loops determined by dividing the closed edge curve into three sided sections using chords. The triangle formed by each sub-loop determines an estimated normal at its corners. The average of the normals for all sub-loops meeting at the end point forming the estimate normal for that end point and the calculated normal can be compared to the estimated normal such that the closest calculated normal for each end point can be determined or the estimated normal can be used if no calculated normal is sufficiently close. The surface generated for the closed edge curve can use the normals at each end point to determine the normal of the surface at that point.

In yet another embodiment, a computer-implemented method for generating a three dimensional (3D) surface based on a closed edge curve is disclosed. The method includes calculating normal vectors at each of the shared endpoints of a plurality of edge segments defined along a singled edge loop such that the normal vectors are an estimate of a continuous three dimensional (3D) surface defined by the single edge loop. The method further includes dividing the now segmented single edge loop into a plurality of sub-loops. Each of the sub-loops is defined by sub-dividing the edge loop segments by chords. For example, each three segment sub-loop contains at least one edge segment and the remaining segments a defined by one or more chord segments. A sub-loop may be divided by selecting a pair of non-adjacent end points along the single edge loop and forming a chord segment from these end points to divide the loop into a pair of sub-loop sharing the chord segment. In this way, a four segment sub-loop may be divided into two three segment sub-loops by choosing the shortest chord from among the two chord possibilities. Similarly, sub-loops with more than four segments may be divided by selecting from among all chord combinations, the longest possible chord with a non-adjacent endpoint that is near the plane of each segment end point and is on the side where the angle between the tangents of the curve segments at each end point is the smallest, and from the set of preferred chords, the shortest may be selected, or if there are no preferred chords, the shortest chord may be selected from the list of all chords combinations, and the system can use the selected chord to divide the sub-loop of the edge segments into two sub-loops that share the selected chord. The method can be implemented iteratively for each remaining sub-loop until all sub-loops contain three edges or fewer. The normals can be selected for each end point in the edge segment closes loop, and surfaces can be generated based on the generated sub-loops.

Other embodiments are disclosed, and each of the embodiments can be used alone or together in combination. Additional features and advantages of the disclosed embodiments are described in, and will be apparent from, the following Detailed Description and the figures.

DETAILED DESCRIPTION

The disclosed system and methods for generating surfaces in 3D modeling tasks automatically parameterizes a curved surface based on the input characteristics of a closed edge curve. The resulting curved surface is a fair or smooth surface that eliminates the unnecessary bows, wrinkles, and saddle shapes produced by other surface modeling techniques. The disclosed system and methods are configured to heuristically sub-divide an area defined by the closed edge curve into a plurality of triangles. A normal vector is calculated at the vertices of each of the plurality of triangles and surfaces are created that match the edge and the corner normal vectors.

In one exemplary embodiment, the disclosed system and methods utilize a set of continuous curves joined end to end to form a single loop as an input to a 3D modeling and surface generation algorithm and process. The result or output of the disclosed system and methods is a set of continuous surfaces that conform to the input and define a single unbroken surface. The disclosed system and methods begin by dividing or segmenting the input curves into simpler units or edge segments. For example, the input curves may be divided in order to limit the amount of curvature and demarcate important curve features such as corners. The disclosed system and methods further recursively subdivides the loop with a chord that splits the now-segmented input curves into pairs of sub-loops. The chord dividing the loop is aligned consistently with the orientation of endpoints associated with each of the edge segments. Subdivision of the loop and sub-loops continues iteratively until each defined sub-loop is reduced to a three-point sub-loop that can be considered a kind of triangle although some of the edges may be curved. The three points alone form a base triangle for the sub-loop from which a surface normal can be derived. In cases where the input loop consists of two or fewer edge segments, the segments may be divided such that three segment sub-loops may be formed. The disclosed system and methods subsequently refine selected adjacent triangular sub-loops to flatten the angle of creases between the adjacent sub-loops. The normal vectors associated with each of the flattened planes are defined and refined and a corresponding surface is generated.

I. System for Implementing Fair 3D Surfacing

Figure 1:
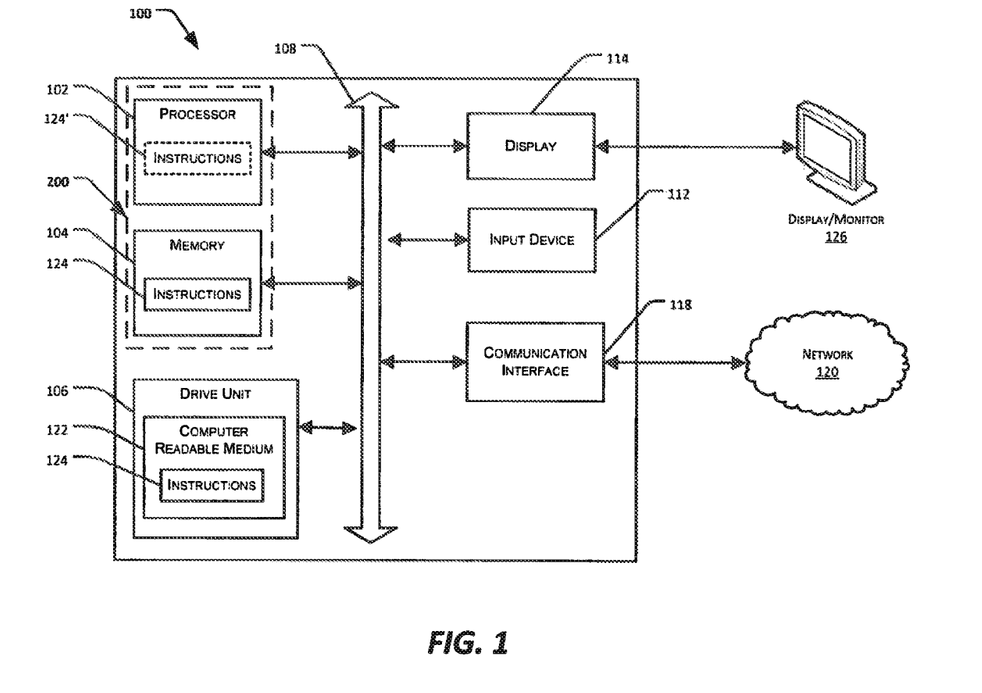
FIG. 1 illustrates a computing system that may be configured to generate a fair three dimensional (3D) surface based on a continuous edge curve input as described and disclosed herein.

FIG. 1 illustrates a layout and configuration for a generalized computer system 100, such as a computer aided design (CAD) workstation, a personal digital assistant (PDA), a tablet computer, a smartphone, a computer, a server, or any of the other computing devices referenced herein. Additional, different, or fewer components may be provided for any specific computing device. The computer system 100 stores and executes algorithms and processor-executable instructions 124 to cause the performance of any one or more of the methods or computer based functions, such as the controller 200 (see FIG. 2) disclosed herein. For example, in this exemplary embodiment, the controller 200 is configured to execute an algorithm for generating three dimensional (3D) surfaces based on a closed loop input. The computer system 100 may operate as a standalone device or may be connected to other computer systems or peripheral devices.

In a networked deployment, the computer system 100 may operate as a server or a client computer in a server-client network environment, or as a peer computer system in a peer-to-peer (or distributed) network environment. The computer system 100 may also be implemented as or incorporated into various devices, such as a personal computer (PC), a tablet PC, a set-top box (STB), a personal digital assistant (PDA), a mobile device, a laptop computer, a desktop computer, a communications device, a wireless telephone, a landline telephone, a control system, a camera, a scanner, a facsimile machine, a printer, a pager, a personal trusted device, a web appliance, a network router, switch or bridge, or any other machine capable of executing the processor-executable instructions 124 (sequential or otherwise) that specify actions to be taken to implement the surface creation module. In a particular embodiment, the computer system 100 may be implemented using electronic devices that provide voice, video and/or data communication. Further, while a single computer system 100 may be illustrated, the term "system" shall also be taken to include any collection of systems or sub-systems that individually or jointly execute a set, or multiple sets, of processor-executable instructions to perform one or more functions via the network.

As illustrated in FIG. 1, the computer system 100 includes a processor 102, such as, a central processing unit (CPU), a graphics-processing unit (GPU), or both. The processor 102 may be a component in a variety of systems. For example, the processor 102 may be part of a standard personal computer or a workstation. The processor hardware may incorporate one or more general processors, digital signal processors, application specific integrated circuits, field programmable gate arrays, servers, networks, digital circuits, analog circuits, combinations thereof, or other now known or later developed devices for analyzing and processing data. The processor-executable instructions 124 may include commands, algorithms and modules for creating fair 3D surface based on an inputted or supplied edge curve. The processor-executable instructions 124' are represented with a dotted line to indicate the portions, modules and data of the stored processor-executable instructions 124 being accessed by the processor 102.

The computer system 100 may include a memory 104 that can communicate via a bus 108. The memory 104 can be divided or segmented into, for example, a main memory, a static memory, and a dynamic memory. The memory 104 includes, but is not be limited to, non-transitory computer readable storage media and various types of volatile and non-volatile storage media such as: random access memory; read-only memory; programmable read-only memory; electrically programmable read-only memory; electrically erasable read-only memory; flash memory; magnetic tape or disk;

optical media and other computer readable mediums. In one case, the memory 104 includes a cache or random access memory for the processor 102. Alternatively, or in addition to, the memory 104 may be system memory that is separated and/or distinct from the processor 102.

The memory 104 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 104 is configured to store processor-executable instructions 124 utilizable by the processor 102. The functions, acts or tasks illustrated in the figures or described herein may be performed by the programmed processor 102 executing the instructions 124 including the surface creation module 200 (see FIG. 2) stored in the memory 104. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 100 may further include a display driver 114 configured to control the output of a display 126 such as a touchscreen, a liquid crystal display (LCD), an organic light emitting diode (OLED) display, a flat panel display, a solid state display, a cathode ray tube (CRT), a projector, a printer or other now known or later developed display device for outputting determined information. The display driver 114 acts as an interface between, for example, the display 126 and the processor 102 that allows the interaction with the software (including the processor-executable instructions 124) stored in the memory 104 or in the drive unit 106.

The computer system 100 further includes an input device 112 configured to allow a user to interact with any of the components of system 100. The input device 112 may be a number pad, a keyboard, or a cursor control device, such as a mouse, or a joystick, touchscreen display, remote control or any other device operative to interact with the system 100.

The computer system 100, in other embodiments, includes a disk or optical drive unit 106 to accessibly interpret a computer-readable medium 122 on which software embodying algorithms or processor-executable instructions 124 are embedded. The algorithms or processor-executable instructions 124 perform one or more of the methods or logic as described herein. The instructions 124 may reside completely, or at least partially, within the memory 104 and/or within the processor 102 during execution by the computer system 100. The memory 104 and the processor 102 also may include other forms or configurations of computer-readable media as discussed above.

The computer-readable medium 122 may include processor-executable instructions 124 or receive instructions 124 responsive to a transmitted signal; so that a device connected to a network 120 or other communications means may communicate voice, video, audio, images or any other data over the network 120. Further, the processor-executable instructions 124 may be transmitted or received over the network 120 via a communication interface 118. The communication interface 118 may be implemented in software or may be a physical connection in hardware. The communication interface 118 provides a connection with the network 120, external media, the display driver 114, or any other components in the system 100 or combinations thereof. In one embodiment, the connection with the network 120 is a physical connection such as a wired Ethernet connection or may be established wirelessly such as via a cellular telephone network (GSM, CDMA), an 802.11 (Wi-Fi), 802.16 (WiMax), 802.20 (mobile broadband), 802.15.4 (ZigBee) and/or Bluetooth networks. The network 120 in other embodiments can be a public network, such as the Internet, a private network, such as an intranet, or combinations thereof, and may utilize a variety of networking protocols now available or later developed including, but not limited to TCP/IP based networking protocols.

The computer-readable medium 122 may be a single medium or may comprise multiple mediums such as a centralized or distributed database and/or associated caches and servers that store one or more sets of instructions. The term "computer-readable medium" is generally utilized to describe any medium that may be capable of storing, encoding or carrying an algorithm or set of instructions for execution by a processor or that may cause a computer system to perform any one or more of the methods or operations disclosed herein.

The computer-readable medium 122 may include a solid-state memory such as a memory card or other package that houses one or more non-volatile read-only memories. The computer-readable medium 122 further includes or encompasses random access memory or other volatile re-writable memory. Additionally, the computer-readable medium 122 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may use a tangible storage medium. The present disclosure may be considered to include any one or more of a computer-readable medium, other equivalents and successor media, in which data or instructions may be stored.

In other embodiments, dedicated hardware implementations, such as application specific integrated circuits (ASIC), programmable logic arrays and other hardware devices, may be constructed to implement one or more of the methods described herein. Applications that include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware means for implementing and utilizing the teaching and disclosure presented and discussed herein.

Figure 2:
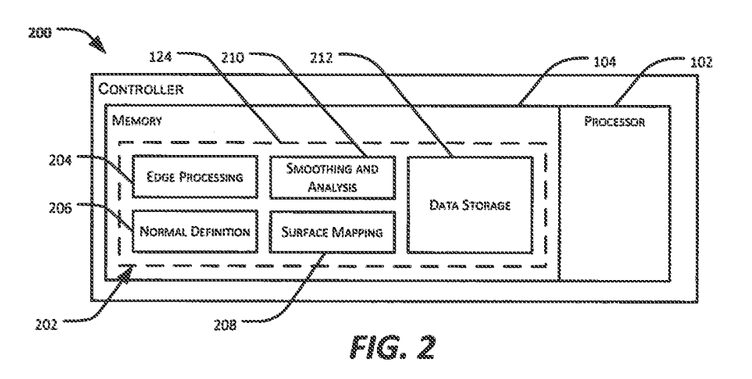
FIG. 2 illustrates a functional block diagram of one embodiment of processor-executable instructions configured to generate the fair three 3D surface.

The controller 200 as discussed and described herein encompasses the features and functionality of the processor 102 and the memory 104. For example, the controller 200 may be an ASIC controller configured to implement the fair 3D surface generation algorithm and process. Alternatively, the controller 200 may simply represent the logical grouping of the controller 102 and the memory 104 as opposed to a physical integration. Thus, as used herein, the term "controller" is intended to mean both the hardware and software that implements the fair 3D surface generation algorithm and process. For example, the fair 3D surface generation algorithm and process increases the efficiency and processing speed of the processor 102 and/or an ASIC controller while the software embodiments the computations, and processor-executable instructions necessary to realize the increased efficiency. The increased efficiency is a product of the fair 3D surface generation algorithm and process' ability to create a smooth and consistent surface based on a closed loop input. The fair 3D surface generation algorithm and process prevents wrinkles or saddle shapes and eliminates unnecessary recalculations and processing.

II. Controller and Method for Fair 3D Surface Generation

FIG. 2 illustrates a functional block diagram of the controller 200 including both the processor 102 and the memory 104. In this exemplary embodiment, the memory 104 stores and contains the processor-executable instructions 124. The instructions 124 may include multiple module, sub-routines and elements for performing the fair 3D surface generation algorithm and process (generally identified by the reference numeral 202.) Alternatively, the instructions 124 may represent a single block of processor-executable code for performing the fair 3D surface generation algorithm and process 202. In the present example, the instructions are illustrated as containing four processing modules and a storage module. The processing modules include: an edge processing module 204; a normal definition module 206; a surface mapping module 208; and a smoothing and analysis module 210. The storage module 212 may cooperate with each of the processing modules 204 to 210 to store and organize the results and data from the processing modules 204 to 210. In another configuration, the storage module 212 may be a portion of the memory 104 and/or the processor 102.

Figures 6A, 6B:
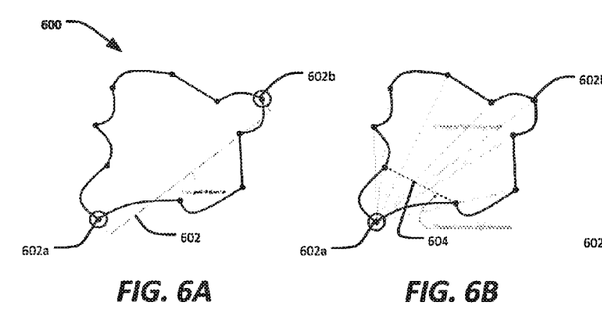
FIGS. 6A to 6E illustrates an analysis of non-adjacent points defined along the edge curve in accordance with the disclosure provided herein.
Figure 6C:
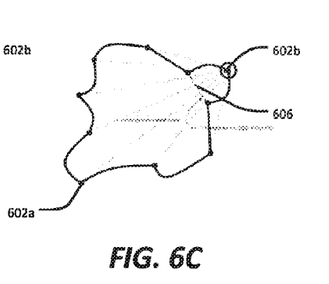
Figure 6D:
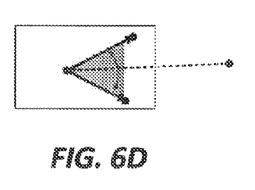
Figure 6E:
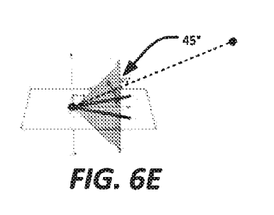
Figure 7:
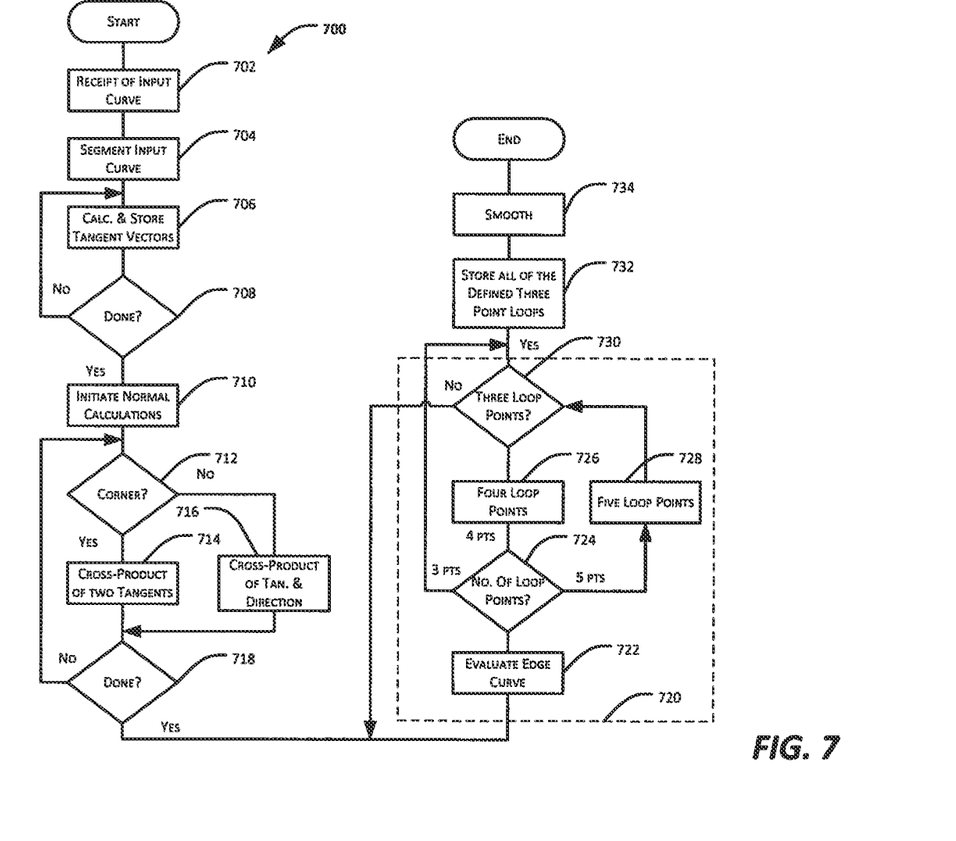
FIG. 7 is a flowchart illustrating the steps and operations performed by a system or controller in accordance with the disclosure provided herein.

FIGS. 3 to 6 illustrate various aspects of the fair 3D surface generation algorithm and process 202. FIG. 7 is a flowchart 700 detailing the steps and processes implemented by the fair 3D surface generation algorithm and process 202. The figures and the flowchart 700 discuss and describe one exemplary implementation of the fair 3D surface generation algorithm and process 202 with reference to the FIGS. 3 to 6.

A. Edge Processing

Figure 3A:
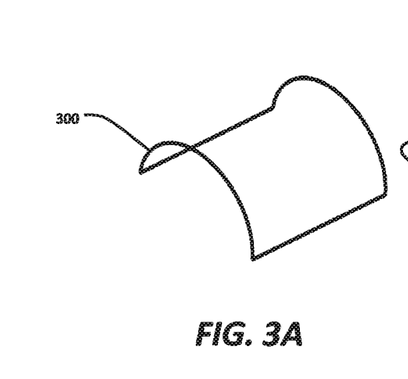
FIGS. 3A and 3B illustrate examples of an edge curve and a segmented edge curve utilized by the system and methods disclosed herein.

An exemplary embodiment of the fair 3D surface generation algorithm and process 202 begins with the receipt or identification of an input edge curve (step 702). For example, the edge processing module 204 may receipt or identification a continuous loop or continuous edge curve 300 (see FIG. 3A) formed from a polynomial representation such as Bezier splines or any other indefinitely scalable curves suitable to model smooth curves. As shown in FIG. 3A, the continuous edge curve 300 defines a closed three dimensional loop without voids, gaps or other breaks in the continuity. In other embodiments, the input curves may be a polyline. The polyline can be converted into a polynomial curve representation utilizing known curve estimation algorithms such as spline fitting.

Figure 3B:
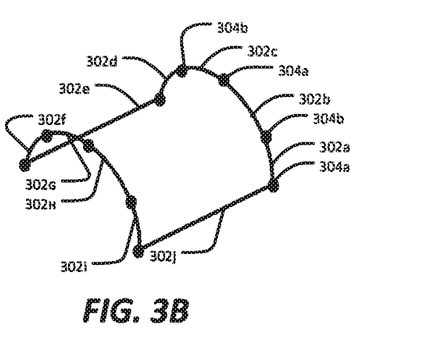

The exemplary edge processing module 204 of the fair 3D surface generation algorithm and process 202 continues by dividing and/or segmenting the received edge curve 300 into a plurality of edge segments 302a to 302j (generally identified by the common reference numeral 302.) The edge segments 302 are defined based on curve features or points of interest (step 704). The curve features utilized by the edge processing module 204 to divide and segment the continuous edge curve 300 may include corners, changes in direction and other inflection points. The curve features may further be defined to identify and separate straight portions of the edge curve 300 from curved positions. Each of the edge segments 302 of the received continuous loop 300 may include or define end points 304a and 304b (generally identified by the common reference numeral 304) joining adjacent edge segments 302. In another embodiment, the edge processing module 204 may use the initially defined edge segments 302 or ignore the original split positions and pick a completely new set. In embodiments based a polynomial curve representation, the end points 304 may represent the split positions of the individual polynomials. In another embodiment, the curve features may be defined to divide or segment the received edge curve 300 evenly to ensure that none of the edge segments 302 curves more than forty-five degrees (45°). The location and information defining each of the end points 304 may be sequentially stored in the data storage module 212 for further analysis and manipulation.

The exemplary edge processing module 204 of the fair 3D surface generation algorithm and process 202 calculates and stores a pair of tangent vectors for each of the stored end points 304 (step 706). For example, the edge processing module 204 calculates a pair of tangent vectors for each of the end points 304 stored in the data storage module 212. The tangent vectors extend in opposite directions from each end point 304 and are, as the name suggests, aligned tangent to the edge curve 300 at that location. When the edge processing module 204 encounters an end point 304 that corresponds to a corner, the determined pair of tangent vectors are arranged in opposing directions relative to each other. This pair of tangent vectors can, in turn, be utilized to determine a potential normal because they are not aligned. Conversely, when the edge processing module 204 encounters an end point 304 that corresponds to a smooth transition between edge segments 302, the determined two pairs of tangent vectors will be aligned resulting in the processing module 204 considering the radial vectors representing the direction of curvature as the determined pairs of tangents. In this instance, the exemplary determined pair of tangent vectors are aligned orthogonal to the tangent to determine a potential normal. The vector information associated with each of the end points 304 may be sequentially stored in the data storage module 212 for further analysis and manipulation. For example, the sequentially stored end points 304 and vector information may be utilized to track and determine which end points 304 come before and after each point along the path of the edge curve 300. The fair 3D surface generation algorithm and process 202 continues to calculate tangents (706) until each of the end points 304 has been evaluated (step 708).

B. Edge Normal Estimation

The fair 3D surface generation algorithm and process 202 subsequently initiates the normal definition module 206 to evaluate each of the end points 304 and the corresponding tangent information stored in the data storage module 212 (step 710). In this way, the normal definition module 206 utilizes the tangent vectors to determine snapping normals aligned perpendicular to an estimate of the final surface. Because the final surface has not yet been calculated and generated by the fair 3D surface generation algorithm and process 202, the estimate of the final surface is a guess of the curvature, configuration and orientation of the final surface.

Figure 4A:
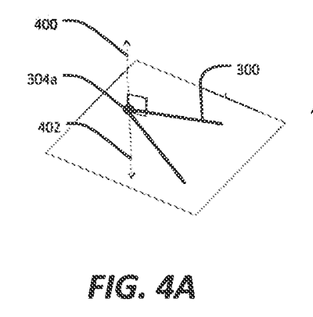
FIGS. 4A and 4B illustrates examples of a normal computed by the system and methods disclosed herein.

The normal definition module 206 assumes that the potential normals and/or normal vectors are regularly aligned with the end point 304 defined for each edge segment 302. The normal definition module 206 initially determines if the end point 304 stored in the data storage module 212 is a corner edge point or a smooth edge point (step 712). Corner end points are points defined at a discontinuous change in direction such as a sharp turn of the continuous edge curve 300 (e.g., see end point 304a). Smooth end points are points that lay along a portion of the edge curve 300 whose direction changes continuously such as a straight line, smooth curve, or inflection point (e.g., see end point 304b). If the specific end point 304 undergoing evaluation is determined to be a corner point, the normal definition module 206 derives the snapping normals and/or normal vectors as the cross product of the associated tangent vectors stored in the data storage module 212 (step 714). The normal definition module 206 assumes that the surface generated at a corner end point 304 is generally meant to be in the plane of the corner. Accordingly, FIG. 4A illustrates two snapping normals or normal vectors 400 and 402 generated orthogonal to the assumed plane of the corner by the normal generation module 206. The two normal vectors 400 and 402 are aligned in opposite directions from each other. However, If the specific end point 304 undergoing evaluation is determined to be a smooth point (see FIG. 4B), the normal definition module 206 derives the snapping normals and/or normal vector as the cross product of the tangent vector and the radial vector aligned in the direction of curvature stored in the data storage module 212 (step 716). In this case, the normal generation module 206 generates four normal vectors 400 to 408 arrayed at ninety degree (90°) intervals to each other and parallel to the stored curvature vector defining the edge segment 302 stored in the data storage module 212. The normal definition module 206 assumes that the surface generated with respect to a smooth edge point is in the plane of the curved edge segment 302 or orthogonal to the direction of the curvature vector defining the edge segment 302. This exemplary normal calculation process of generating snapping normals and/or normal vectors is repeated by the normal definition module 206 (see 712) until each end point 304 stored within the data storage module 212 has been evaluated (step 718). The calculated snapping normals and normal vectors are, in turn, stored in the data storage module 212 and associated with the appropriate end point 304.

C. Surface Mapping

The fair 3D surface generation algorithm and process 202 subsequently activates the surface mapping module 208 to divide and segment the edge curve 300 into multiple smaller edge curve loops or sub-loops (process 720 indicated by the dashed line). The surface mapping module 208 evaluates the edge curve to determine the number of end points dividing each of the edge segments (step 724). If the closed edge curve or loop 500 is defined by only one or two end points 504, the surface mapping module 208 handles this special case by dividing at least one of the curve segments such that the loop contains three or more segments.

If the surface mapping module 208 determines that the edge curve under evaluation includes three end points (step 724), the division and segmentation of the surface mapping module 208 is complete (skip to step 732). Alternatively, if the surface mapping module 208 determines that the exemplary closed edge curve or loop 500 (see FIG. 5A) includes four edge segments (individually identified as segments 502a to 502d and generally identified by the common reference numeral 502) defined by end points 504a to 504d (generally identified by the common reference numeral 504), then the closet pair of opposing end points (e.g., end point 504a to 504c) is selected to define a chord 506 bisecting the loop 500 (see FIG. 5B). Stated another way, the surface mapping module 208 defines a bisecting chord 506 having the shortest length between opposing pairs of end points (step 726).

Figure 8:
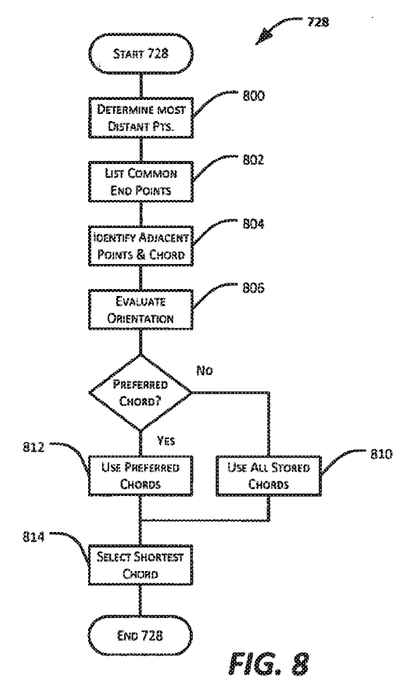
FIG. 8 is a flowchart illustrating the steps and operations of an iterative selection process implemented in connection with the process shown in the flowchart of FIG. 7.

If the surface mapping module 208 determines that an exemplary closed edge curve or loop 600 contains five or more points (see FIG. 6A), an iterative selection process is utilized to select pairs of non-adjacent points to form the division line or chord (step 728). For example, the selection process represented by the step 728 may be further illustrated in FIG. 8. As shown in FIG. 8, the selection process 728 may initialize by selecting the most distant pair of nonadjacent end points (step 800) identified along the edge curve 600 by the surface mapping module 208 (e.g., the end points that establish chord 602). The location information of each of the end points defining chord 602 is stored in the data storage module 212. The location information of the two end points 602a and 602b is recorded but the corresponding chord 506 does not necessarily become the one for division of the edge curve 600.

The selection process 728 utilized by the surface mapping module 208 defines and maintains a list of all nonadjacent end point pairs that share at least one of the end points 602a and 602b stored in the data storage module 212 (step 802). Additionally, the selection process further stores the end point information defining the chords 604, 606 (step 804). Conceptually, the chord 604 and 606 can be considered "in front" of the selected end points 602a and 602b, respectively. The adjacent end points are defined as the end points immediately before and after each of the selected end points 602a and 602b. FIG. 6B illustrates a representation of the edge curve 600 and the chord emanating from the end point 602a to each of the end points 602j, while FIG. 6C illustrates a representation of the edge curve 600 and the chord emanating from the end point 602b to all of the end points 602j.

Figure 4B:
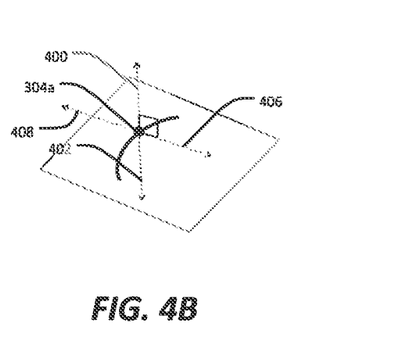
Figure 5A:
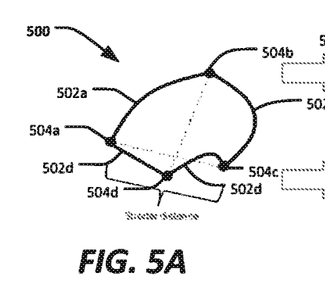
FIGS. 5A and 5B illustrates an edge loop divided into a pair of sub-loops in accordance with the disclosure provided herein.
Figure 5B:
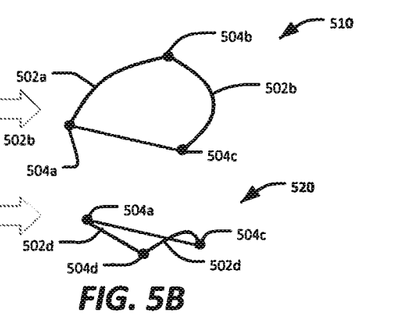

The selection process 728 utilized by the surface mapping module 208 evaluates the stored information defining each of the chords emanating from one of the two end points 602a and 602b. The information stored by the selection process 728 in the data storage module 212 is organized based on the orientation of the resulting chord with respect to one of the end points 602a or 602b. For example, the selection process 728 identifies a preferred chord based on the orientation of the corresponding end points 602a or 602b end point information defining each of the stored chords (step 806). In one example, the section process 728 evaluates the orientation based on the snapping normals defined as illustrated in FIGS. 4A and 4B. For example, the section process 728 identifies the chords projected onto the planes defined by the snapping normals and filters out those chords not inside the smaller angle of the two tangent vectors. In this way, the smooth point 304a shown in FIG. 4B is preferred if it is arranged in the same direction as the direction of curvature for the edge curve (see FIG. 6D). Similarly, the chord vector from the appropriate end point 602a and 602b should be no more than forty-five degrees above the plane of the point as shown in FIG. 6E. A chord that exceeds the forty-five degree threshold is not a preferred chord. Thus, in one configuration, the section process 728 identifies chords that are both inside the tangent vectors and no more than forty-five degrees above the plane of the appropriate end point 602a and 602b (step 808).

In the instance where none of the identified chords satisfies both of the desired thresholds, the list of all chords emanating from end point 602a and 602b is utilized (step 810) including the chord in front of the points is used. Regardless of the group or list of chords is utilized by the selection process 728, the chord with the shortest distance between end points is selected (step 814). The selected chord is, in turn, utilized to divide the edge curve 600. In this embodiment, the end points of the divided sub-loops retain their normal and tangent vector information except at the points where the loop was divided. At these exemplary points the chord replaces the edge segment for that end point and the tangent vector for the chord is used instead of the segment that was cut away. In an embodiment, the snap vectors initially computed may be retained for these end points.

The sub-loop 720 division process continues recursively until none of the remaining sub-loops includes more than three points (step 730). The newly divided sub-loops are stored in the data storage module 212 in a processing queue (step 732).

D. Surface Generation

The fair 3D surface generation algorithm and process 202 may subsequently activate the smoothing and analysis module 210 and utilize the divided sub-loop information stored in the data storage module 212 in order to further smooth the surface derived from the stored divided sub-loops. In particular, the exemplary smoothing and analysis module 210 may be further configured and programmed to eliminate deep creases between any two triangular planes defined by each of the three point defined sub-loops (e.g., the sub-loops 510 and 520 shown in FIG. 5B). One exemplary smoothing operation that may be performed by the smoothing and analysis process represented by the step 734 may be further illustrated in FIG. 9.

Figure 9:
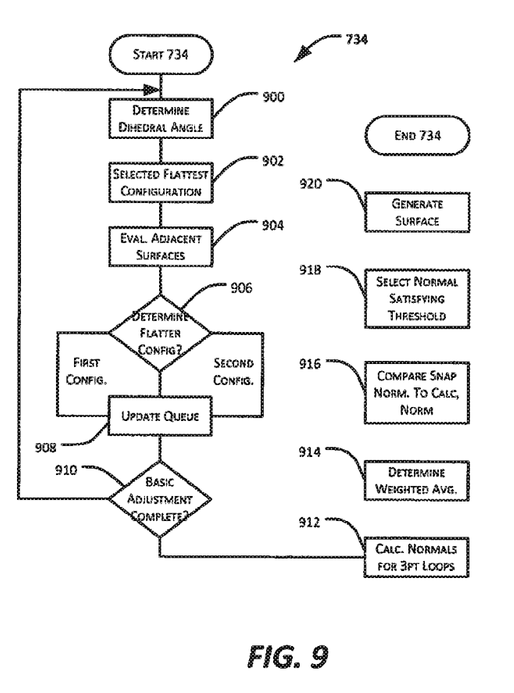
FIG. 9 is a flowchart illustrating the steps and operations of a smoothing operation implemented in connection with the process shown in the flowchart of FIG. 7.

In one embodiment, the smoothing and analysis module 210 calculates the dihedral angle between adjacent triangular planes (step 900) formed by the three points in the sub-loop. The division and segmentation process 720 assumes the original edge segments 302 to be straight lines or line segments and creates a tessellated surface of triangles based on the identified end points 304. The smoothing and analysis module 210 attempts to identify configurations or arrangements of the triangular planes defined by each of the three point defined sub-loops that flatten or increase the angle there between (step 902). In operation, the relative alignment between the individual triangular planes can be altered by swapping one chord extending between a first set of end points of adjacent triangles with another chord that extends between the a second set of end points of the adjacent triangles. After each swap to a new configuration, the smoothing and analysis module 210 selects one of the two configuration that possess a measured dihedral angle closest to one-hundred eighty (180°) degrees.

The smoothing and analysis module 210, after identifying the flattest or smoothest configuration, utilizes the sub-loop and end point information stored in the processing queue defined within the data storage module 212 to evaluate the flatness of adjacent triangles and sub-loops (step 904). In one implementation, the smoothing and analysis module 210 analyzes the sub-loop information stored in the processing queue to determine which configuration and arrangement of the adjacent triangles and sub-loops produces the smoothest surface. The analysis, as described above, involves swapping chords with adjacent triangles and identifying which configuration produces the flattest or smoothest triangle pairs (step 906). When the smoothing and analysis module 210 identifies a preferable configuration, the other, non-selected, configurations are removed from the processing queue (step 908). The smoothing and analysis module 210 continues (proceed to step 900) until all edges are processed (step 910).

Once the preliminary alignment and adjustment process is completed, the smoothing and analysis module 210 begins to finalize the orientation and alignment necessary to generate a smooth surface based on the triangles and sub-loops stored in the data storage module 212. Upon completion of the final orientation, the smoothing and analysis module 210 generates a surface element for each of the defined and stored triangles and sub-loops.

The smoothing and analysis module 210 begins the final orientation process of the fair 3D surface generation algorithm 202 by calculating a normal vector for each of the triangles and sub-loops organized and stored in the data storage module 212 (step 912). In particular, the smoothing and analysis module 210 calculates a plane normal based on the stored three points that define each triangle. In one exemplary embodiment, the smoothing and analysis module 210 may ignore any curved edge segments 302 contained within the sub-loop.

Plane normals determined by the smoothing and analysis module 210 to be adjacent to one of the end points 304 defining each edge segment 302 may be analyzed based on a weighted average scheme (step 914). All of the triangles that share a common end point will be adjacent to one another and fan out from the point starting from an original edge curve segment. The fanned triangles is defined by a series of individual triangles sharing common chord segments and ending at the opposite end point defining the original edge curve segment. For example, the plane normals determined to be adjacent to an end point 304 may each be modified by a weight or weighting factor that represents the angle of the triangle corner corresponding to the end point 304. The resulting weighted normals can, in turn, be averaged to define an average weighted normal. In this way, the smoothing and analysis module 210 calculates and defines a single averaged surface normal for each end point for each edge curve segment stored in the data storage module 212.

The smoothing and analysis module 210, in turn, compares the stored triangle or surface normal to the previously defined and stored snapping normals (step 916). For example, when the comparison is between a snap normal corresponding to smooth end point 304, the surface normal is projected into the plane defined by the normal vectors 400 to 408 for analysis. In another example, when the comparison is between a snap normal corresponding to corner end point 304, snap normal corresponding to normal vectors 400 and 402 can be compared directly with the surface normal. In this manner, the smoothing and analysis module 210 can calculate the angle between the surface normal and the corresponding snap normal. When the smoothing and analysis module 210 determines that the surface normal is close to a snap normal; the closest snap normal may be utilized in place of the surface normal (step 918). However, when the surface normal is not close to any snap normal; the surface normal or the projection of the surface normal may be utilized in place of the snap normal. The threshold for determining whether or not the surface and snap normal are close for normals associated with a corner end point may be defined as a angular range of between zero (0°) and sixty (60°) degrees. Alternatively, or in addition to, the threshold for determining whether or not the surface and snap normal are close for normals associated with a smooth end point may be defined as a angular range of between zero (0°) and thirty (30°) degrees. Other thresholds may be defined to achieve different results.

In another embodiment or configuration, the fair 3D surface generation algorithm and process 202 may integrate the surface normals of adjacent pre-existing surfaces into the final, calculated normal. For example, the input to the process 202 includes not only the edge curve 300 and edge segments 302 but further includes the surfaces defined and estimated that already is connected to the edge curve 300. In embodiments in which the edge curve 300 includes existing adjacent surfaces, the additional normals may increase the range between which the process 202 considers a surface normal and a corresponding snap normal to be close. The range around snap normals that are closest to the adjacent surface normal are altered to ensure their selection occurs with thresholds greater than zero to thirty or zero to sixty degrees. For example, the range around the closest snap normal may be increased by thirty-three percent (33%) to insure that a range from zero to thirty degrees is replaced by a range from zero to forty degrees degrees. In one or more embodiments, the ranges around other snap normals may be left as normal or decreased by a similar amount.

The smoothing and analysis module 210 of the fair 3D surface generation algorithm and process 202 may utilize the calculated surface normals to generate surfaces for each triangle stored in the data storage module 212. For example, the smoothing and analysis module 210 may create an N-patch or triangular Bézier surface to replace each triangle in the sub-loop triangle mesh. In particular, the positions of the stored end points 304 and the associated surface normals are used to create DeCasteljau triangles. The collection of these surfaces then is used as the final surface (step 920).

In this way, the exemplary the fair 3D surface generation algorithm and process 202 provides a convenient means to generate fair surfaces for a loop of curved lines. The process 202 beneficially reduces creases and generates a surface to follow the likely direction that the user intended.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A system for generating a three dimensional (3D) surface based on a closed edge curve, the system comprising:
   a processor;
   a memory in communication with the processor, the memory storing processor-executable instructions configured to:
      identify a plurality of curves, wherein the plurality of curves are continuously joined to define a single edge loop;
      segment the edge loop to define a plurality of edge segments, wherein each of the plurality of edge segments is associated with a curve feature;
      define a set of snap normal vectors for each end point defining the plurality of edge segments;
      reduce the segmented edge loop to a plurality of sub-loops divided by chords, wherein each of the sub-loops is defined by three end points of one of the plurality of curves, wherein the processor-executable instructions are further configured to:
         select a chord division from a set of points including two points having a greatest linear distance therebetween, and wherein a tangent of the two points is substantially adjacent to a plane defined by the snap normals and between the tangents vectors of the end point; and
         determine a surface normal based on a weighted average normal of the divided sub-loops that share a given end point and the snap normals defined for that given end point.

2. The system of claim 1, wherein the processor-executable instructions are further configured to:
   select a pair of sub-loop triangles that share a common chord division segment;
   determine a second surface normal for the pair of sub-loop triangles having a chord division based on an opposite pair of end points for the selected pair of triangles; and
   replace the original chord and sub-loop triangles with a new pair a new chord and a second pair of sub-loops triangles when an angle between determined second surface normal define a flatter surface than a surface defined by the original pair of surface normals determined for the pair of sub-loop triangles having a chord.

3. The system of claim 1, wherein the normal vector determined for each of a plurality of edge segments defined between pairs of end points is based on the surface normals if an angle between each of the compared surface normals and the corresponding snap normal vectors for a smooth end point exceeds sixty degrees (60°).

4. The system of claim 1, wherein the normal vector determined for each of a plurality of segment end points is based on the surface normals if an angle between each of the compared surface normals and the corresponding snap normal vectors for a corner end point exceeds thirty degrees (30°).

5. The system of claim 1, wherein the normal vector determined for each of a plurality of segment end points is based on the snap normal for a smooth end point if an angle between each of the compared surface normal and the corresponding snap normal vector is lesser than sixty degrees (60°).

6. The system of claim 1, wherein the normal vector determined for each of a plurality of segment end points is based on the snap normal for a corner end point if an angle between each of the compared surface normal and the corresponding snap normal vector is lesser than thirty degrees (30°).

7. The system of claim 1 further comprising:
   generate a final generated three dimensional (3D) surface based on the selected plurality of final normal vectors.

8. The system of claim 1, wherein the normal vector is defined orthogonal to an estimate of a final generated three dimensional (3D) surface.

9. The system of claim 1, wherein the curve feature is selected from the group of features consisting of: a change in direction, a linear curve portion, and a curve portion having an interior angle of less than or equal to forty-five degrees (45°).

10. A computer-implemented method for generating a three dimensional (3D) surface based on a closed edge curve, the method comprising:
    receiving an input from an input device, the input corresponding to a plurality of curves joined to define a single edge loop;
    analyzing, by a computer system, each of the plurality of curves to define a plurality of edge segments based on an identified curve feature;
    defining, by the computer system, a set of snap normal vectors for each of the end points defining each of the plurality of edge segments;
    defining, by the computer system, a plurality of sub-loops within the segmented edge loop, wherein each of the plurality of sub-loops is defined by chords connecting three end points of the original curve;
    selecting, by the computer system, a preferred chord from a set of all chords defined between one of the end points and the remaining non-adjacent end points defined along the single edge loop, wherein the preferred chord is the longest chord defined within the set of all chords and having a tangent and direction substantially adjacent to a plane formed by the snap normals and between tangents vectors defined at each of the end point; and
    determining, by the computer system for computer-aided design of a model, a surface normal based on a weighted average of each normal defined at a shared end point for each of the defined sub-loops and the snap normals defined for that end point.

11. The computer-implemented method of claim 10 further comprising:
    selecting a pair of sub-loop triangles that share a common chord division segment;
    determining a second surface normal for the pair of sub-loop triangles having a chord division based on an opposite pair of end points for the selected pair of triangles; and
    replacing the original chord and sub-loop triangles with a new pair a new chord and a second pair of sub-loops triangles when an angle between determined second surface normal define a flatter surface than a surface defined by the original pair of surface normals determined for the pair of sub-loop triangles having a chord.

12. The computer-implemented method of claim 11, wherein the angle is the dihedral angle calculated between the surfaces defined for the first and second pair of triangles.

13. The computer-implemented method of claim 10, wherein one or more of the normal vectors is calculated as the cross-produce of two opposing tangent vectors describing the curvature of the estimate of the continuous 3D surface at endpoints.

14. The computer-implemented method of claim 10 further comprising:
calculating a plurality of surface normals for each vertices comprising the end points of the edge curve segments;
calculating each of the surface normal according to a weighted average determined as a function of an angle defined at each vertices; and
selecting a plurality of final normal vectors based on a comparison of each surface normals to the corresponding snap normal vectors.

15. The computer-implemented method of claim 14 further comprising:
generating a final three dimensional (3D) surface based on the selected plurality of final normal vectors.

16. The computer-implemented method of claim 14, wherein the plurality of final normal vectors is based on the surface normals if an angle between each of the compared surface normals and the corresponding snap normal vectors exceeds sixty degrees (60°) for smooth end points.

17. The computer-implemented method of claim 14, wherein the plurality of final normal vectors is based on the surface normals if an angle between each of the compared surface normals and the corresponding snap normal vectors exceeds thirty degrees (30°) for corner end points.

18. The computer-implemented method of claim 14, wherein the plurality of final normal vectors is adjacent to a segment of the edge loop and is based on the snap normals if an angle between each of the compared surface normals and the corresponding normal vectors lesser than sixty degrees (60°) for smooth end points.

19. The computer-implemented method of claim 14, wherein the plurality of final normal vectors is adjacent to a segment of the edge loop and is based on the snap normals if an angle between each of the compared surface normals and the corresponding normal vectors lesser than sixty degrees (30°) for corner end points.

20. The computer-implemented method of claim 10, wherein the identified curve feature is selected from the group of features consisting of: a change in direction, a linear curve portion, and a curve portion having an interior angle of less than forty-five degrees (45°).

21. A computer-implemented method for generating a three dimensional (3D) surface based on a closed edge curve, the method comprising:
calculating, by a controller of a computer-aided design system, normal vectors at each of the endpoints of a plurality of edge segments defined along a singled edge loop, wherein the normal vectors are an estimate of a continuous three dimensional (3D) surface defined by the single edge loop;
dividing, by the controller, the segmented single edge loop into a plurality of four-point sub-loops based on the plurality of edge segments, wherein each of the sub-loops is defined by a pair of triangles sharing a common chord;
reducing, by the controller, the segmented edge loop to a plurality sub-loops divided by chords, wherein each of the sub-loops is defined by a set of three end points associated with the segmented edge loop;
determining, by the controller, a surface normal based on the weighted average of each normal for one of the end points shared by the sub-loops and the snap normals defined for that end point;
generating, by the controller, the continuous 3D surface based on all sub-loop triangles associated with the segmented edge loop;
calculating, by the controller, a plurality of surface normals for each sub-loop triangle;
calculating, by the controller, a surface normal for each end point vertices according to a weighted average determined as a function of an angle defined at each vertex;
selecting, by the controller, a plurality of final normal vectors based on a comparison of each surface normals to the corresponding snap normal vectors; and
generating, by the controller, a final three dimensional (3D) surface based on the selected plurality of final normal vectors.

22. The computer-implemented method of claim 21, wherein the edge segments are defined based on a curve feature selected from the group of curve features consisting of: a change in direction, a linear curve portion, and a curve portion having an interior angle of less than or equal to forty-five degrees (45°).

23. The computer-implemented method of claim 21, wherein one or more of the normal vectors is calculated as the cross-produce of two opposing tangent vectors describing the curvature of the estimate of the continuous 3D surface at endpoints.

* * * * *